US012665733B2

(12) United States Patent
Puzey et al.

(10) Patent No.: US 12,665,733 B2
(45) Date of Patent: Jun. 23, 2026

(54) MAILBOX MESSAGE EXCHANGE BETWEEN DAISY-CHAINED NODES IN A SYNCHRONOUS COMMUNICATION NETWORK

(71) Applicant: Analog Devices International Unlimited Company, Limerick (IE)

(72) Inventors: Matthew Puzey, Norwood, MA (US); Martin Kessler, Salem, MA (US); Lewis F. Lahr, Dover, MA (US); Jagannath Nagaraj Rotti, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 327 days.

(21) Appl. No.: 18/427,280

(22) Filed: Jan. 30, 2024

(65) Prior Publication Data

US 2025/0132888 A1     Apr. 24, 2025

(30) Foreign Application Priority Data

Oct. 18, 2023    (IN) .............................. 202341070824

(51) Int. Cl.
*H04L 5/14* (2006.01)
*H04L 1/00* (2006.01)
(52) U.S. Cl.
CPC .............. *H04L 5/14* (2013.01); *H04L 1/0061* (2013.01)

(58) Field of Classification Search
None
See application file for complete search history.

(56) References Cited

U.S. PATENT DOCUMENTS

| | | | | |
|---|---|---|---|---|
| 8,842,547 B2 * | 9/2014 | Suzuki | .................. | H04L 1/0061 |
| | | | | 370/241 |
| 11,487,682 B1 * | 11/2022 | Deb | ...................... | H04L 49/901 |
| 2016/0025795 A1 * | 1/2016 | Martin | ................. | G01R 31/006 |
| | | | | 324/503 |

* cited by examiner

*Primary Examiner* — Angela Nguyen
(74) *Attorney, Agent, or Firm* — ArentFox Schiff LLP

(57) ABSTRACT

A communication system includes a plurality of nodes connected in a daisy-chain via respective bus links configured for full duplex, synchronized communication. A node is configured to communicate a mailbox message with one or more connected nodes, the mailbox message having a flexible message size or flexible destination defined based on register access. A node includes a mailbox register configured to store a message header and one or more words of a current message for one or both of a transmit direction or a receive direction. The node includes a message buffer configured to store one or more messages including the current message for transmission or reception. The node includes a tunnel controller configured to communicate the current message from or to the message buffer as one or more mailbox packets with one or more of the connected nodes that participate in a mailbox tunnel over the daisy-chain.

23 Claims, 10 Drawing Sheets

500

102

510a

510b

110 — Node 0

104

520a — A

104 — 120a

Node 1

510b

104

120b — Node 2

520b — B

104

Node 3

120c

104

130 — Node 4

ACK

530

900

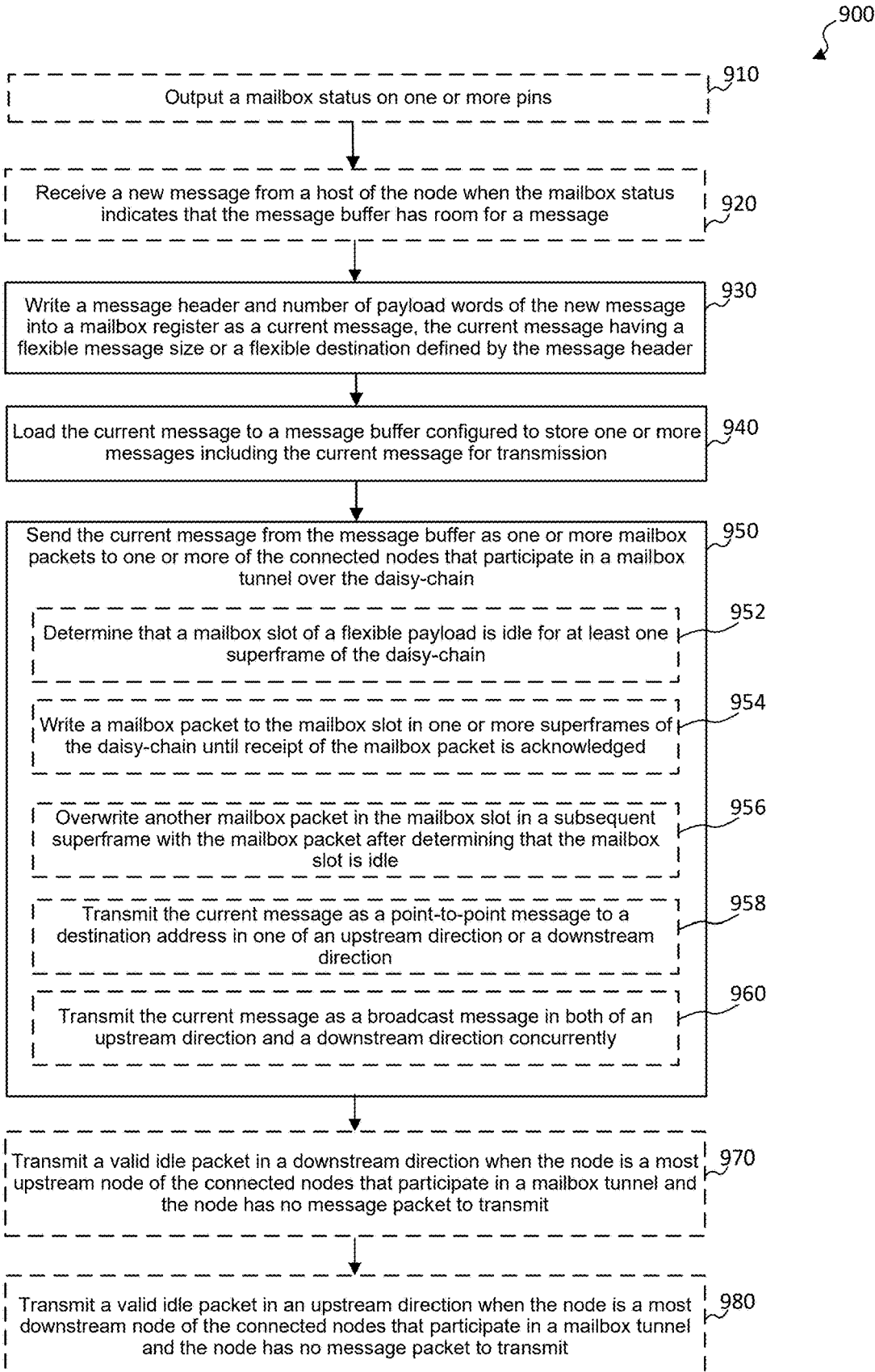

910
Output a mailbox status on one or more pins

920
Receive a new message from a host of the node when the mailbox status indicates that the message buffer has room for a message 930
Write a message header and number of payload words of the new message into a mailbox register as a current message, the current message having a flexible message size or a flexible destination defined by the message header 940
Load the current message to a message buffer configured to store one or more messages including the current message for transmission 950
Send the current message from the message buffer as one or more mailbox packets to one or more of the connected nodes that participate in a mailbox tunnel over the daisy-chain 952
Determine that a mailbox slot of a flexible payload is idle for at least one superframe of the daisy-chain 954
Write a mailbox packet to the mailbox slot in one or more superframes of the daisy-chain until receipt of the mailbox packet is acknowledged 956
Overwrite another mailbox packet in the mailbox slot in a subsequent superframe with the mailbox packet after determining that the mailbox slot is idle 958
Transmit the current message as a point-to-point message to a destination address in one of an upstream direction or a downstream direction 960
Transmit the current message as a broadcast message in both of an upstream direction and a downstream direction concurrently 970
Transmit a valid idle packet in a downstream direction when the node is a most upstream node of the connected nodes that participate in a mailbox tunnel and the node has no message packet to transmit 980
Transmit a valid idle packet in an upstream direction when the node is a most downstream node of the connected nodes that participate in a mailbox tunnel and the node has no message packet to transmit

FIG. 9

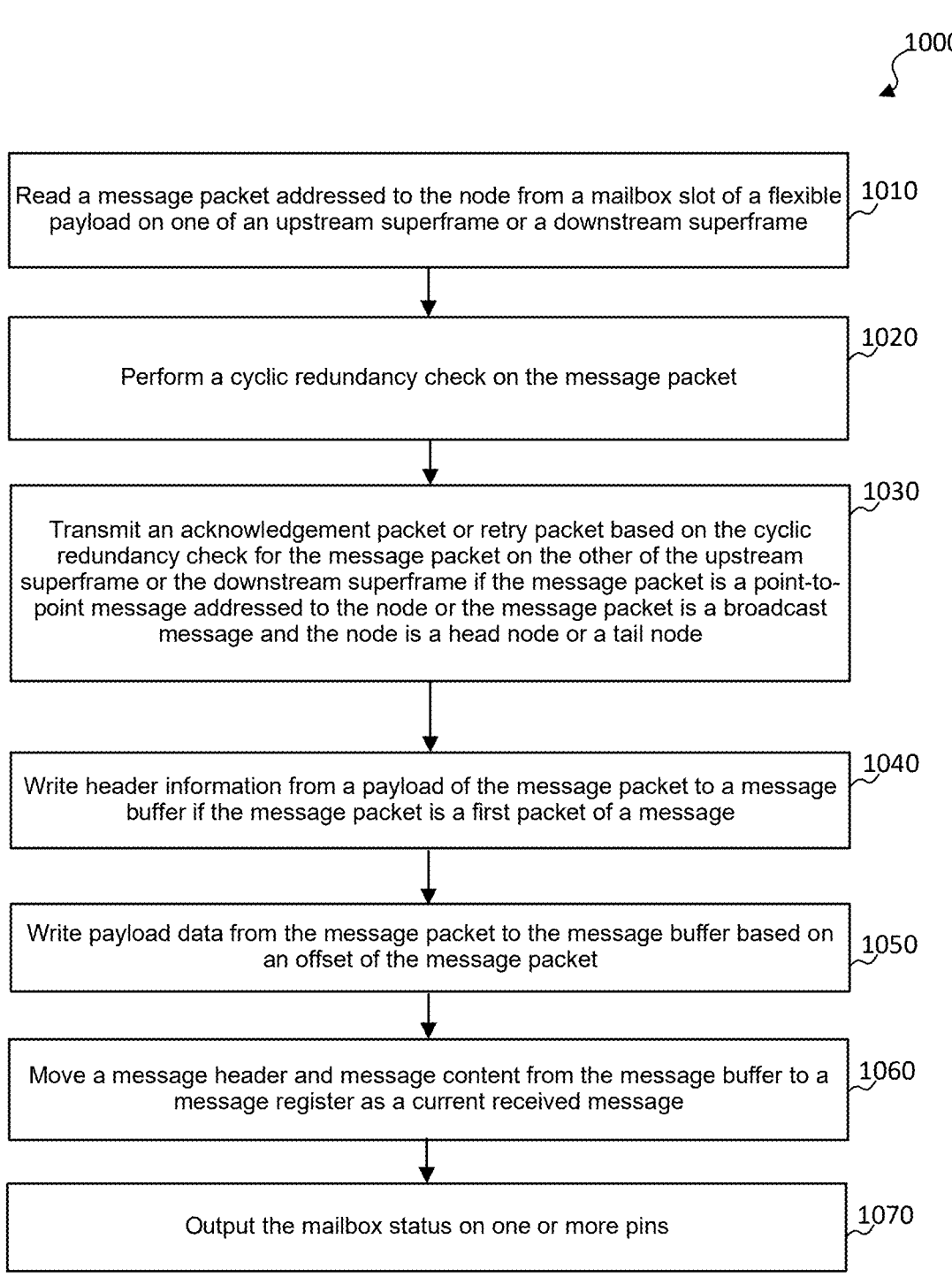

1000

Read a message packet addressed to the node from a mailbox slot of a flexible payload on one of an upstream superframe or a downstream superframe 1010

Perform a cyclic redundancy check on the message packet 1020

Transmit an acknowledgement packet or retry packet based on the cyclic redundancy check for the message packet on the other of the upstream superframe or the downstream superframe if the message packet is a point-to-point message addressed to the node or the message packet is a broadcast message and the node is a head node or a tail node 1030

Write header information from a payload of the message packet to a message buffer if the message packet is a first packet of a message 1040

Write payload data from the message packet to the message buffer based on an offset of the message packet 1050

Move a message header and message content from the message buffer to a message register as a current received message 1060

Output the mailbox status on one or more pins 1070

FIG. 10

MAILBOX MESSAGE EXCHANGE BETWEEN DAISY-CHAINED NODES IN A SYNCHRONOUS COMMUNICATION NETWORK

CROSS-REFERENCE TO RELATED APPLICATIONS

This application claims priority to Indian Provisional Application No. 202341070824 titled "MAILBOX MESSAGE EXCHANGE BETWEEN DAISY-CHAINED NODES IN A SYNCHRONOUS COMMUNICATION NETWORK," filed Oct. 18, 2023, which is assigned to the assignee hereof, and incorporated herein by reference in its entirety.

TECHNICAL FIELD

This disclosure is related to wired communication systems, and more particularly to synchronous, full duplex daisy-chained communication systems.

INTRODUCTION

Audio communication within vehicles has moved from analog signals (with one or two analog wires per signal) to digital communications (with multiple audio streams on a single wire or wire-pair). Example digital audio communication technologies may use a one-directional ring topology. Other technologies, e.g., Ethernet use a point-to-point technology that requires an Ethernet switch between each link as well costly audio clock regeneration at each node.

A2B is a true daisy-chained network with low latency because it does not require store-and-forward between nodes. A2B uses line coding and is time division multiplexed. Although A2B is the most established low latency audio communication in the car today, improvements in bandwidth may be useful to support future applications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a node connected in a daisy-chain over full duplex links to one or more connected nodes, the node including: a mailbox register configured to store a message header and one or more words of a current message for one or both of a transmit direction or a receive direction; a message buffer configured to store one or more messages including the current message for transmission or reception; and a tunnel controller configured to communicate the current message from or to the message buffer as one or more mailbox packets with one or more of the connected nodes that participate in a mailbox tunnel over the daisy-chain, the current message having a flexible message size or a flexible destination defined by the message header.

In some aspects, the techniques described herein relate to a method for a node to communicate a mailbox message in a daisy-chain over full duplex links to one or more connected nodes, the method including: writing a message header and a number of payload words of a new message into a mailbox register as a current message, the current message having a flexible message size or a flexible destination defined by the message header; loading the current message to a message buffer configured to store one or more messages including the current message for transmission; and sending the current message from the message buffer as one or more mailbox packets to one or more of the connected nodes that participate in a mailbox tunnel over the daisy-chain.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To provide a more complete understanding of the present disclosure and features and advantages thereof, reference may be made to the following description, taken in conjunction with the accompanying figures, wherein like reference numerals represent like parts, in which:

FIG. 9 is a flowchart of an example method of sending a mailbox message performed by a node in a daisy-chain, according to an aspect of the disclosure;

FIG. 10 is a flowchart of an example method of receiving a mailbox message performed by a node in a daisy-chain.

DETAILED DESCRIPTION

Figure 1:
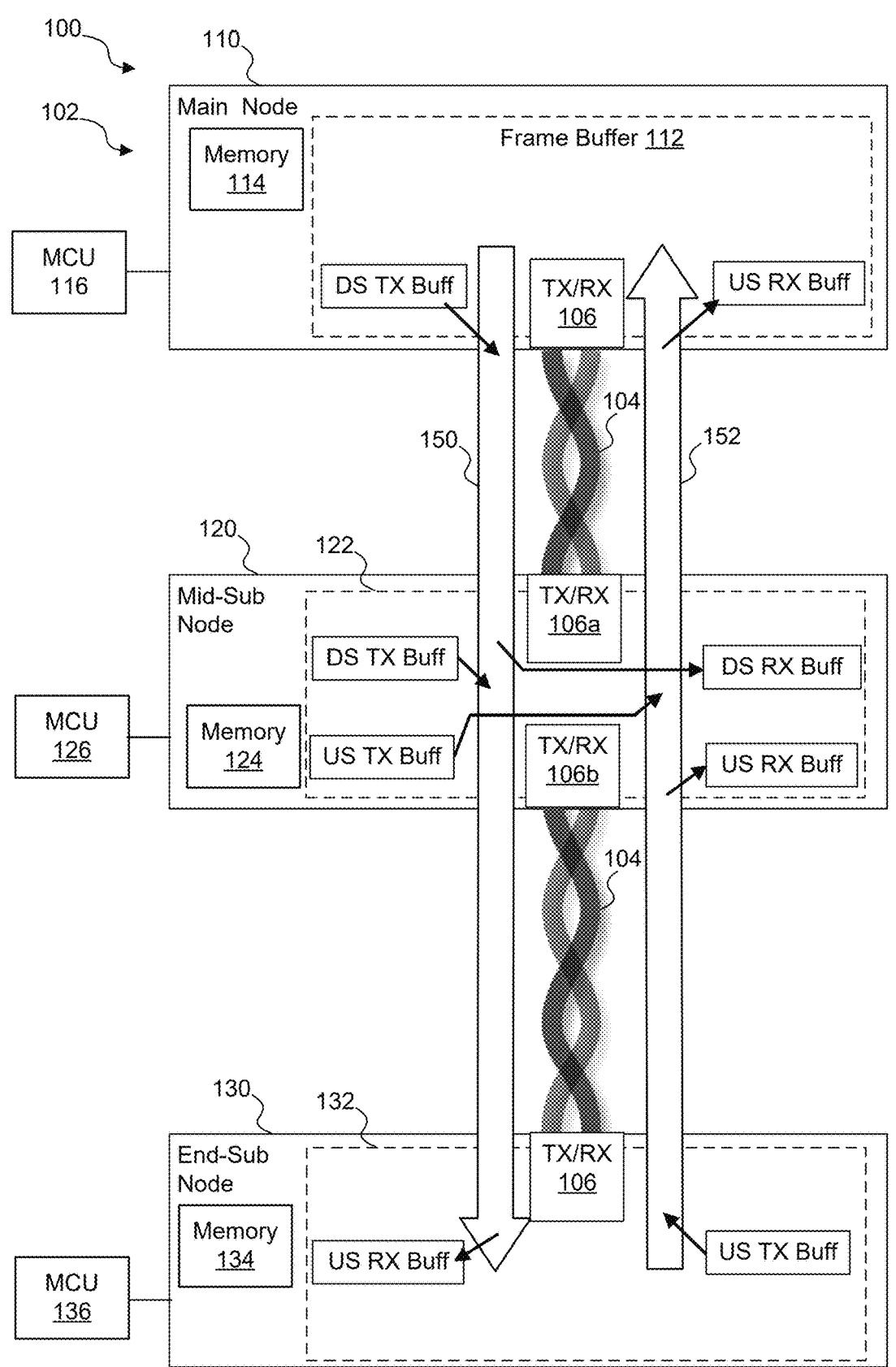
FIG. 1 is a diagram of nodes in a daisy-chain, according to an aspect of the disclosure.

Current daisy-chain communication systems provide for discovery of nodes in the chain. Typically, the daisy-chain follows a fixed frame schedule. One issue with having a flexible number of nodes and unknown cable lengths in a daisy-chain relates to timing with respect to the frame schedule. For example, A2B discovery does not automatically adjust response times and does not automatically phase align the nodes. Further, a mailbox exchange on such a system may only allow for mailbox exchanges between the main node and a sub node, as directed only by the main node using header data in the A2B frame (not payload). This approach may be restricted to a finite number of active messages, and the messages may be limited to a same fixed size.

In an aspect, the present disclosure uses a completely different approach that allows any node to address any other node that participates in the mailbox tunnel or addresses all nodes (broadcast) that participate in the mailbox tunnel. It also allows for multiple parallel mailbox tunnels that are separated from each other in a flexible payload of the daisy-chain. The disclosure describes the tunnel packet with its message commands, message signaling and protocols, including error detection/signaling and re-transmission.

In an aspect, mailbox communication in full-duplex serial synchronous daisy-chained communications allows micro-controllers (MCUs) on different nodes to exchange messages with each other asynchronously over the synchronous network with a unique communication protocol that allows node-to-node and node to many (broadcast) mailbox message exchanges. This eliminates the need for other additional communication links such as a controller area network (CAN) bus in the system.

The present disclosure describes a flexible register-based mailbox (MBX) messaging system that allows point-to-point and point-to-many message exchange over a communication network. Little (destination node number) or no (broadcast) knowledge of the network is required by the MCUs participating in the network. From the perspective of a MCU, messages are fire-and-forget with delivery failure interrupt requests (IRQs). A flexible message payload size, for example, from 0 to 63 words, is supported on a per message basis. General purpose input/output (GPIO), IRQ, and register based mailbox flags may be supported for transmit (Tx) and receive (Rx) message management. FIFO based message queues may be implemented to allow for multiple simultaneous incoming and outgoing messages.

Messages may be broken into multiple CRC protected packets, which are transmitted over a mailbox tunnel. Mailbox tunnels are assigned to a portion of the flexible payload in the serial, synchronous upstream and downstream communication frames. Transmissions are tolerant of bus errors because they are acknowledged by the receiving node with a receipt or a rejection and may be retried until acknowledged. Mailbox tunnels are self-arbitrated by the nodes. Each node waits until it sees an idle packet on both the current and previous incoming upstream and downstream packets before it transmits a Tx message. If multiple nodes start a transmission in the same frame, the message with the shortest loop will win and see a valid reception response. Any node that does not receive a valid response may continue transmitting until it receives a valid response. Nodes that started transmission may continue transmitting until their entire message is sent. All other nodes may wait until the bus is idle again to start transmitting. Nodes may transmit otherwise back to back new messages with at least one idle frame in between.

Head and tail nodes have additional transmission responsibilities. Head nodes may transmit a valid idle packet when not sending a Tx message or response, on the downstream mailbox tunnel. Tail nodes may transmit a valid idle packet when not sending a Tx message or response, on the upstream mailbox tunnel. Non-valid mailbox tunnel packets may be interpreted as a busy tunnel for purpose of bus arbitration. Head and tail nodes may be the only nodes that respond to broadcast transmissions.

FIG. 1 is a diagram 100 of nodes in a daisy-chain 102. In the daisy-chain 102, each node is connected to a subsequent node via a bus link 104. For example, the bus link 104 may be a twisted pair. As illustrated, the daisy-chain 102 includes a main node 110, one or more mid-sub nodes 120, and an end-sub node 130. In some implementations, each node is a device including one or more modems.

Each node 110, 120, 130 includes a corresponding frame buffer 112, 122, 132. The frame buffers 112, 122, 132 are configured to store information for one or more frames for transmission via the bus links 104 in a downstream direction (from main node 110 toward end-sub node 130) and an upstream direction (from end-sub node 130 toward main node 110). For example, the frame buffer 112 of main node 110 may include an upstream receive buffer (US RX Buff) and a downstream transmit buffer (DS TX Buff). The frame buffer 122 of a mid-sub node 120 may include US RX Buff and a DS TX Buff as well as a downstream receive buffer (DS RX Buff) and an upstream transmit buffer (US TX Buff). The frame buffer 132 of the end-sub node 130 may include a DS RX Buff and an US TX Buff.

Each node 110, 120, 130 further includes one or more transceivers 106 (TX/RX). Each transceiver 106 is configured to generate a signal on a corresponding bus link 104 based on either the contents of the respective frame buffers 112 or 132 or based on the input signal from the other link in a mid-sub node with content that is selectively to be replaced by respective frame buffer 122 locations. In an aspect, the transmission on the bus links 104 are full duplex. That is the bus links 104 can simultaneously carry a downstream signal and an upstream signal. In some implementations, the communications utilize a carrier-based modulation scheme with echo-cancelation to achieve full duplexing. For example, the signals may use binary phase shift keying (BPSK), quadrature phase shift keying (QPSK) or Quad Amplitude Modulation (QAM).

In an aspect, the daisy-chain 102 may provide low latency due to circumventing or forsaking store-and-forward functionality at each node. Data coming from the direction of the main node 110 may be immediately forwarded toward the end-sub node 130. Data coming from the direction of the end-sub node 130 may be immediately forwarded toward the main node. For example, the data arriving on a bus link 104 at a transceiver 106a may be copied by the transceiver 106b for transmission on the bus link 104. Each node selectively reads data when the data goes through the node. Each node also selectively changes the data without a store-and-forward of the whole frame or sections of the frame. For example, at a sub-node 120, the transceiver 106a receives a downstream signal 150 and selectively reads data to the DS RX buffer. The transceiver 106b selectively changes data in the downstream signal 150 (e.g., based on DS TX buffer and immediately forwards the downstream signal 150 toward end-sub node 130. Simultaneously, the transceiver 106b receives an uplink signal 152 and selectively reads data to the US RX buffer. The transceiver 106a selectively changes data in the upstream signal 152 and immediately forwards the upstream signal 152 toward main node 110. Accordingly, the frame buffer 122 does not store an entire frame before forwarding the frame to a next node, thereby providing low-latency communications. For example, data may be forwarded from the main node 110 to the end-sub node 130 within less than half of one sampling period, which may be, for example, 10.4 microseconds (μs).

In an aspect, the communications are synchronized according to a superframe structure. For example, the superframes may be transmitted on a 48 kHz cycle with each superframe being 20.82 μs. The payload in each frame may be 256 bytes for a data rate of 98.304 Mbps. Further details of synchronization and the frame structure are described below.

Additionally, each node may include a respective memory 114, 124, 134 for storing configuration information for the node. In some implementations, the memory 114, 124, 134 is an addressable register, a one-time programmable (OTP) memory, or an electronically erasable programmable memory (EEPROM) that stores an identifier of the node. In some implementations, the order of the nodes is flexible and a position of the node within the daisy-chain 102 may be determined during a discovery procedure based on the stored identifier.

In some implementations, one or more nodes may include or be connected to a respective microcontroller, microprocessor, or DSP (MCU) 116, 126, 136. For example, the MCU 116, 126, 136 may be connected to a node via a time division multiplexed (I2S/TDM) connection, Inter-Integrated Circuit (I²C), or serial peripheral interface (SPI). The MCU 116, 126, 136 may configure the respective node as well as communicate with the other nodes via the daisy-chain 102. For example, in an audio system, an audio source may originate from the DSP (MCU) in a main node 110. Some sub nodes 120 such as intelligent amplifiers may include an MCU, but other nodes such as subwoofers or microphone nodes may not include an MCU.

Figure 2:
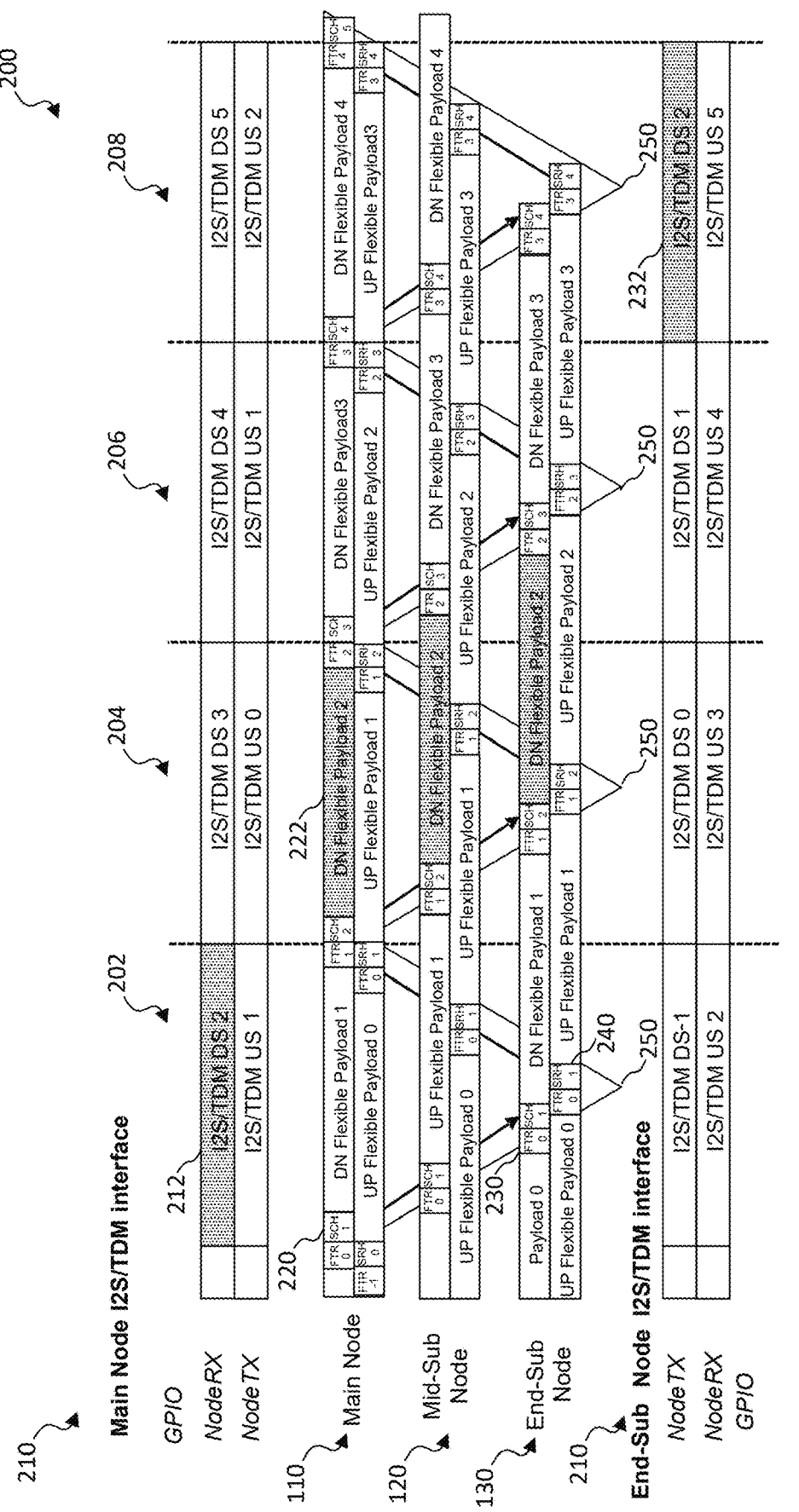
FIG. 2 is a timing diagram of synchronous communication for nodes in a daisy-chain, according to an aspect of the disclosure.

FIG. 2 is a timing diagram of synchronous communication for nodes in a daisy-chain 102. The communications may be transmitted with superframes within sample periods including a first sample period 202, a second sample period 204, a third sample period 206, and a fourth sample period 208. For example, the nodes include the main node 110, a mid-sub node 120, and an end-sub node 130. The downstream and upstream signals for each node are divided into a header (e.g., synchronization control header (SCH) or synchronization response header (SRH)), flexible payload bytes, and footer (FTR) in each superframe.

In some implementations, one or more of the nodes, e.g., main node 110 and end-sub node 130 may include other node components connected via a time division multiplexing (TDM) interface 210 such as PS/TDM. For example, if the node is an audio node such as a microphone or speaker, an audio signal may be input or output to the daisy-chain 102 via the I²S/TDM interface. The I²S/TDM interface pins or other pins on the chip may alternatively be used as general purpose input-output (GPIO) pins at the node. The daisy-chain 102 may also be synchronized with the I²S/TDM interface 210 at the main node and provide synchronization at the respective I²S/TDM interfaces 210 to the sub nodes.

In an aspect, the main node 110 I²S/TDM sample may be synchronized with the superframe. For example, the main node 110 may transmit a SCH 220 at the start of each sample period. Due to transmission delay and processing at each node, each subsequent node may transmit the corresponding SCH slightly later within the sample period. The end-sub node 130 may receive a superframe ending with a FTR 230 within the same sample period and transmit an upstream frame beginning with an SRH 240. The upstream frame may be transmitted in the upstream direction at each node such that the SRH 240 is received at the main node 110 within the same sample period. Accordingly, the synchronization may provide control and response within one sample period.

Communications with the TDM interfaces may be synchronized and use an additional superframe. For example, as illustrated, a main node 110 may load transmit frame buffer content with an I²S/TDM data stream sample 212 during a first audio sample period 202 to build up a new superframe.

The main node 110 may transmit the new downstream frame with the audio stream sample being part of the flexible payload 222 in the second sample period 204. The daisy-chain 102 may carry the flexible payload 222 to the end-sub node 130 in the second sample period 204 and third sample period 206. The end-sub node 130 may then transmit the audio stream inside the flexible payload 222 as an I²S/TDM frame 232 during the fourth sample period 208.

In an aspect, all of the nodes sample data at the same time (same phase) based on the received timing information. With the timing information each node is fully aware of the start 250 of the sampling period, which can be determined from the middle between dnSCH and upSRF-½ tsf). During the sampling period, each node may sample data from a source to a TX buffer for a flexible payload. For example, audio devices may sample an audio signal for an audio stream. In an aspect, the flexible payload may support other types of data such as control for a pulse width modulation (PWM) signal or data from an analog-to-digital converter (ADC), which may provide sensor data, for example.

In an implementation, a PWM duty cycle may be controlled by flexible payload bytes. For instance, a flexible payload for control of a PWM duty cycle allows an PS/TDM interface e.g. from an Audio DSP in one node to directly control PWM duty cycle on another node. If PWM is used for audio influenced light effects (e.g., light organ), the audio DSP can directly control the LEDs with low latency based on its native processing without having to use asynchronous communication over I²C or SPI. PWM can also be used to control the output voltage of a voltage regulator, e.g. one that feeds the power rails of a class-D amplifier. When low level audio signals are expected, PWM can be set to create a low supply voltage and high supply voltage when high volume audio output is expected (look ahead control from the DSP). The PWM duty cycle can be controlled either asynchronously from the same node's or another node's I²C (from main node) or SPI (from any other node) interface or synchronously with lower latency over I²S/TDM from another node.

Figure 3:
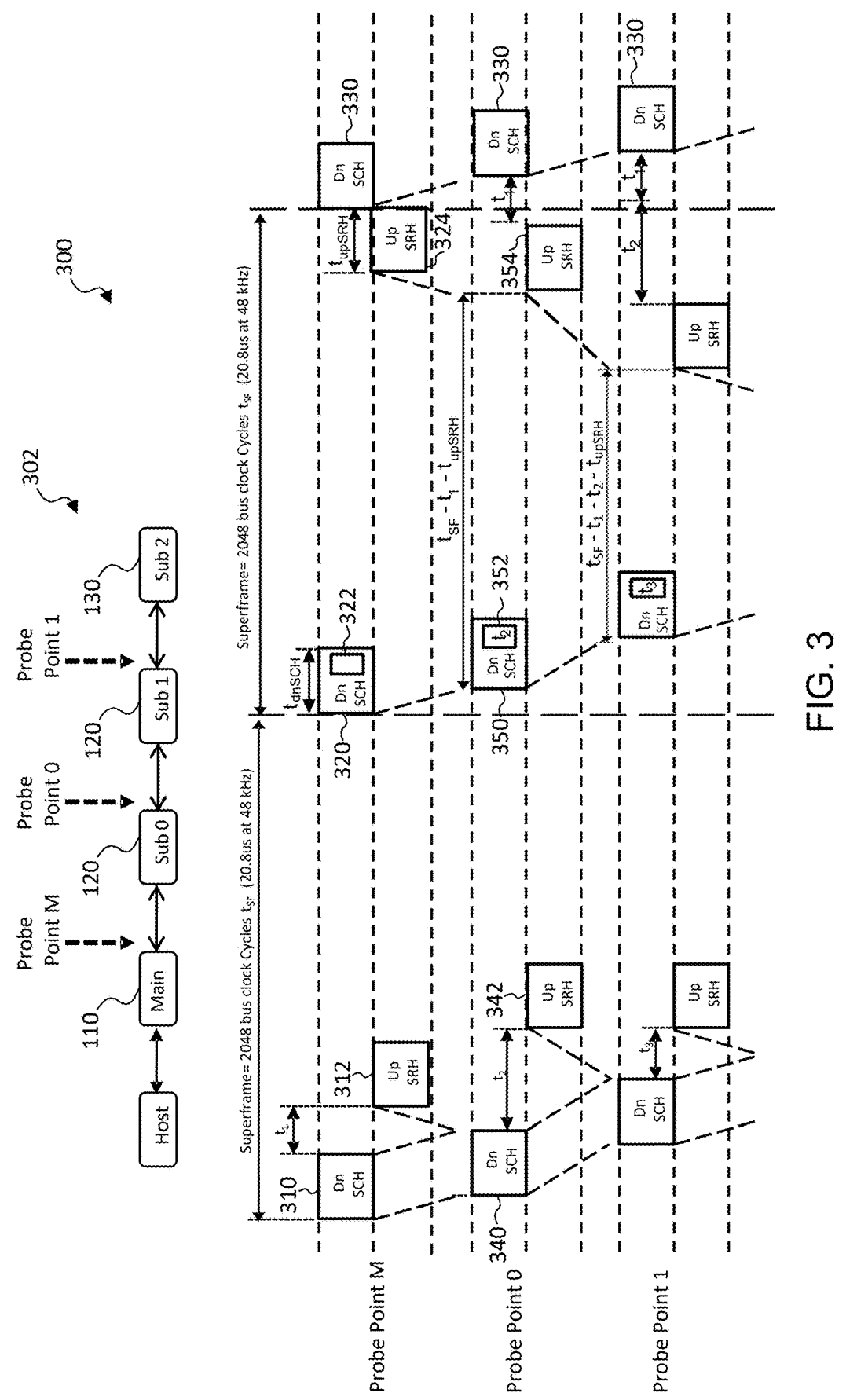
FIG. 3 is a diagram of a synchronization procedure for nodes in a daisy-chain; according to an aspect of the disclosure.

FIG. 3 is a diagram of a discovery procedure 300 for nodes in a daisy-chain 302. For example, the discovery procedure 300 can be used to establish the timing of the headers, flexible payload bytes, and footers at each node. In the illustrated example, a daisy-chain 302 includes a total of 4 nodes (e.g., with 2 mid-sub nodes 120), but additional nodes may be included. The signals for a probe point corresponding to each bus are illustrated.

The main node 110 may optionally perform line diagnostics and provide bus power to downstream sub node 0. The main node 110 starts sending downstream data in the form of a DnSCH 310 that includes a downstream lock pattern. When sub node 0 is in lock it starts responding with an UpSRH 312 that includes an upstream lock pattern. The main node 110 measures a delay time $t_1$ and sends DnSCH 320 with delay information 322 to sub node 0. The delay time $t_1$ represents cable delay of the bus link 104 plus receive and transmit path delay between nodes. Sub node 0 responds with a time adjusted UpSRH 324. For example, the time adjusted UpSRH 324 is synchronized to finish by the end of the main node's superframe before the next DnSCH 330 from the main node 110. For instance, the time adjusted UpSRH 324 may be transmitted $t_{SF}$-$t_1$-$t_{upSRH}$ after the DnSCH 320 is received at the sub node 0. $t_{SF}$ is the duration of a superframe, and $t_{upSRH}$ is the duration of the time adjusted UpSRH. Sub node 0 locks to the downstream signal from the main node 110.

The main node or sub node 0 optionally perform line diagnostics and provide bus power to downstream sub node 1. If all is well sub node 0 starts sending data downstream including DnSCH 340. When sub node 1 is in lock it starts responding with UpSRH 342. Sub node 0 measures delay time $t_2$ and sends DnSCH 350 with delay information 352 to sub node 1. Sub node 1 responds with time adjusted UpSRH 354. The time adjusted UpSRH 354 for sub node 1 is synchronized to end $t_1+t_2$ before the DnSCH 330 arrives at sub node 0. For instance, the time adjusted UpSRH 354 may be transmitted from sub node 1 at $t_{SF}$-$t_1$-$t_2$-$t_{upSRH}$ after the DnSCH 350 is received at the sub node 0. Accordingly, sub node 0 may receive the UpSRH 354 and retransmit as the time adjusted UpSRH 324. Now the main node 110 can talk with sub node 1.

The discovery procedure 300 continues for each sub node in the daisy-chain 302 using the same procedure at each node. It should be understood that the discovery procedure may be performed over multiple superframes. In an aspect, the number of nodes in the daisy-chain 302 may be based on a time budget. For example, the time budget may be expressed as:

$$t_{Budget}=t_{SF}-t_{SCH}-t_{SRH}-2\times(t_{Cable}+\#\text{Subs}\times t_{Proc})>0$$

Assuming a 1 us processing delay and 80 bits each for SCH and SRH at 98.304 Mbit/s, 9 sub nodes may be allowed with a maximum overall distance of 50 m, assuming cable latency $t_{cable}$ of 6.5 ns/m. For example, 9 sub nodes may be suitable for a vehicle entertainment system including microphones and speakers.

Figure 4:
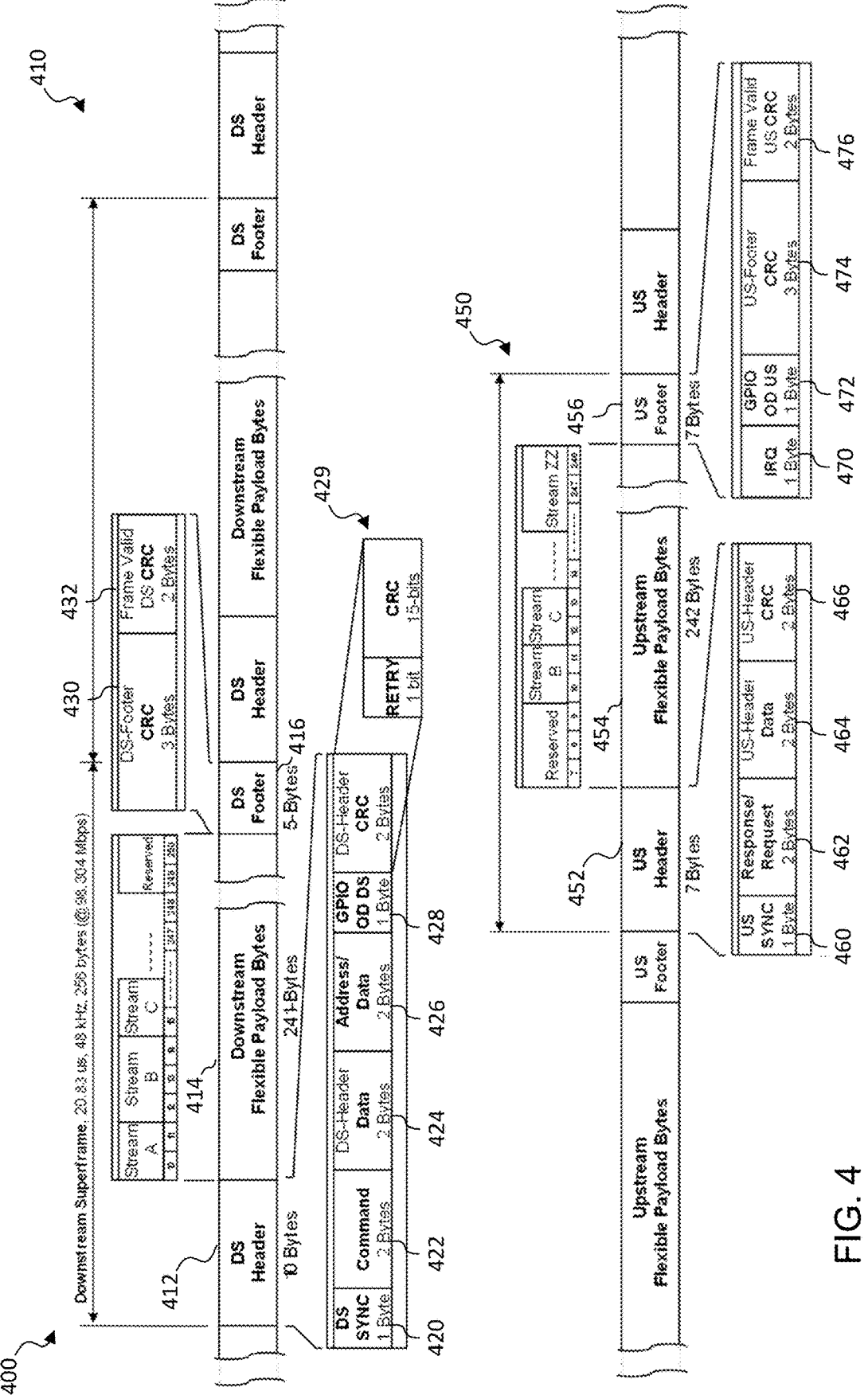
FIG. 4 is a diagram of examples of frame structures, according to an aspect of the disclosure.

FIG. 4 is a diagram 400 of examples of frame structures. The diagram 400 includes an example of a downstream superframe 410 and an example of an upstream superframe 450.

The downstream superframe 410 includes a downstream synchronization header 412, a downstream flexible payload 414, and a downstream footer 416. The downstream synchronization header 412 includes a downstream synchronization byte 420 with a modulo frame counter, a command field 422, data field 424, data or address field 426, GPIO over distance byte 428, retry-bit and CRC 429. The downstream flexible payload 414 includes a plurality of bytes that may be flexibly configured to carry data streams. For example, a stream mapping may indicate which bytes of the downstream flexible payload 414 carry each stream. Further details of the flexible payload 414 are described with respect to FIG. 7. The downstream footer 416 includes a CRC 430 for the downstream flexible payload 414 and a frame valid indication 432 with its own CRC.

The downstream synchronization byte 420 indicates the start of a frame and includes a modulo frame counter value. The command field 422 provides for control signaling and addresses a node. The data field 424 and data or address fields 426 depend on the command field 422. The GPIO over distance byte 428 indicates the status of one or more virtual GPIO pins. The CRC 429 is a CRC of the downstream header 412 including a retry bit and 15 bit CRC. The CRC 430, in the downstream footer 416, provides a CRC for the downstream flexible payload 414.

The frame valid indication 432 is an indication with separate CRC bits that indicates whether the downstream frame was valid when it arrived at the previous node. For example, a sub node may check the CRC 430 and determine that the received flexible payload is not valid. The sub node, however, may have data to transmit on the flexible payload and calculate a new CRC 430. Accordingly, the frame transmitted by the sub node may have a correct CRC 430, but the frame valid indication 432 may indicate that other data in the flexible payload is not valid.

The upstream superframe 450 includes an upstream header 452, an upstream flexible payload 454, and an upstream footer 456. The upstream header 452 includes an upstream synchronization byte 460, a response/request field 462, data field 464, and a header CRC 466. Similar to the downstream flexible payload 414, the upstream flexible payload 454 includes a plurality of bytes that may be flexibly configured to carry data streams. The upstream flexible payload 454 may be defined by the same or different stream map in regards to the downstream stream map and the stream mapping may be different between each node. The upstream footer 456 includes an interrupt request (IRQ) byte 470, a GPIO byte 472, a CRC 474 for the upstream flexible payload 454, and a frame valid indication 476 with its own CRC.

The upstream synchronization byte 460 indicates the start of an upstream superframe 450. The response/request field 462 is a response to a command field 422 or a request for control signaling. Data field 464 is defined based on the response/request field 462. The header CRC 466 is calculated based on the content of the upstream header 452. The interrupt request byte 470 indicates an interrupt request detected at a downstream node. The GPIO byte 472 indicates the status of the one or more virtual GPIO pins at downstream nodes. The CRC 474 is calculated based on the upstream flexible payload 454. The frame valid indication 476 operates in the same manner as the frame valid indication 432 but for the upstream direction. In some cases, a node may not receive an upstream header 452 from a downstream node (e.g., if the downstream node becomes disconnected). The node may generate an upstream frame including a new UpSRH in the absence of a received UpSRH from the downstream node.

Figure 5:
FIG. 5 is a block diagram of example mailbox over a daisy-chain, according to an aspect of the disclosure.

FIG. 5 is a block diagram 500 of example mailbox tunnels 510 (e.g., tunnel 510a and 510b) over a daisy-chain 102. In the illustrated example, the daisy-chain 102 includes five nodes: a main node 110, three mid-sub nodes 120 (e.g., mid-sub nodes 120a, 120b, 120c), and an end-sub node 130. Each node has an address 0-4, which may be detected during discovery.

The participation and role of a node within a mailbox tunnel 510 may be based on a register. For example, the nodes 120a and 120c may participate in a first tunnel 510a with the node 120a being a head node and the node 120c being a tail node. The nodes 110, 120b, and 130 may participate in a second tunnel 510b with the main node 110 being the head node and the end-sub node 130 being the tail node. Each tunnel 510 may be assigned different bytes of the flexible payloads 414 and 454 for the daisy-chain 102.

In an aspect, the nodes of each tunnel 510a may perform access control. A node may initiate a transmission only when the tunnel 510 is idle (e.g., based on an idle message sent from a head node or tail node. All nodes that have a message to transmit after an idle frame may attempt to transmit the message. Generally, mailbox messages with a shorter transmission distance will overwrite messages from nodes further away.

In an example, the node 110 and the node 120b may both attempt to transmit a mailbox message to node 130 in the tunnel 510b following the same idle frame. The node 110 may first write a mailbox packet 520a to the designated bytes of the downstream flexible payload 414 in the downstream superframe 410. When the downstream superframe 410 reaches the node 120b, the node 120b will overwrite the mailbox packet 520a in the designated bytes of the downstream flexible payload 414 with its own mailbox packet 520*b*. The node 130 will receive the mailbox packet 530*b* and transmit an acknowledgment in the upstream flexible payload 454. The node 120*b* will receive the acknowledgment packet 530 and send the next packet in its message. The node 110 will not receive an acknowledgment packet 530 for the packet 520*a* and will retransmit the packet 520*a*. Because the node 120*b* is downstream from the node 110, the node 120*b* will overwrite the packet 520*a* until the node 120*b* completes transmission of its message. The node 120*b* will not be able to start another message because the tunnel 510*b* is not idle. The node 110 will therefore be able to send packets 520*a* to the node 130. Once all messages are successfully received and acknowledged, the node 110 may then transmit an idle frame to indicate that nodes may start a new message.

Figure 6:
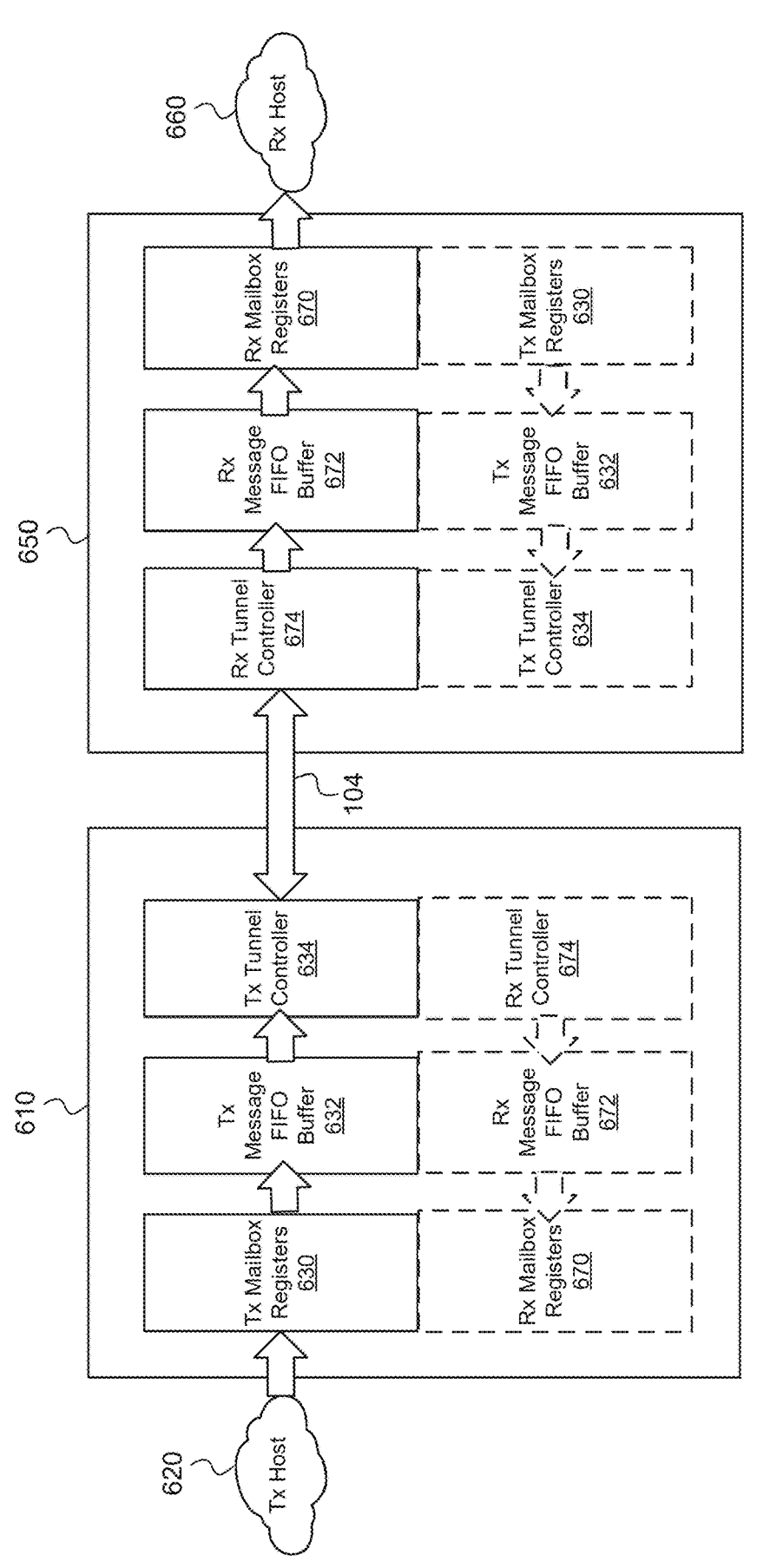
FIG. 6 is a block diagram of example components of a transmitting node and a receiving node, according to an aspect of the disclosure.

FIG. 6 is a block diagram 600 of example components of a transmitting node 610 and a receiving node 650. It should be understood that a node may include the components of both a transmitting node 610 and a receiving node 650.

The transmitting node 610 may be associated with a Tx host 620 and include Tx mailbox registers 630, a Tx message FIFO buffer 632, and a Tx tunnel controller 634. The Tx host 620 may be an electronic component that may transmit or receive mailbox messages via the daisy-chain 102. The Tx host 620 may include an MCU 116, 126, 136. The Tx host 620 may communicate with the node via a short range interface such as a PS/TDM connection, I²C, SPI, or MII. The Tx mailbox registers 630 are configured to store a message header and one or more words of a current message for a transmit direction. The Tx message FIFO buffer 632 is configured to store one or more messages including the current message for transmission. The Tx tunnel controller 634 is configured to communicate the current message from the Tx message FIFO buffer 632 as one or more mailbox packets with one or more of the connected nodes (e.g., receiving node 650) that participate in a mailbox tunnel 510 over the daisy-chain 102. The current message may have a flexible message size or a flexible destination defined by the message header.

The receiving node 650 may be associated with a Rx host 660 and include Rx mailbox registers 670, a Rx message FIFO buffer 672, and a Rx tunnel controller 674. For any particular node, the receiving host 660 may be the same as the transmitting host 620 (e.g., an MCU 116, 126, 136). The transmitting host 620 may include an MCU 116, 126, 136. The receiving host 660 may communicate with the receiving node 650 node via a short range interface such as a I²S/TDM connection, I²C, SPI, or MII. The Rx tunnel controller 674 is configured to communicate (i.e., receive) the current message from the Rx message FIFO buffer 672 as one or more mailbox packets with one or more of the connected nodes (e.g., transmitting node 610) that participate in a mailbox tunnel 510 over the daisy-chain 102. The Rx message FIFO buffer 672 is configured to store one or more messages including the current message as the message is received by the Rx tunnel controller 674. The Rx mailbox registers 670 are configured to store a message header and one or more words of the current message for a receive direction. The Rx mailbox registers 670 may be read by the Rx host 660.

Figure 7:
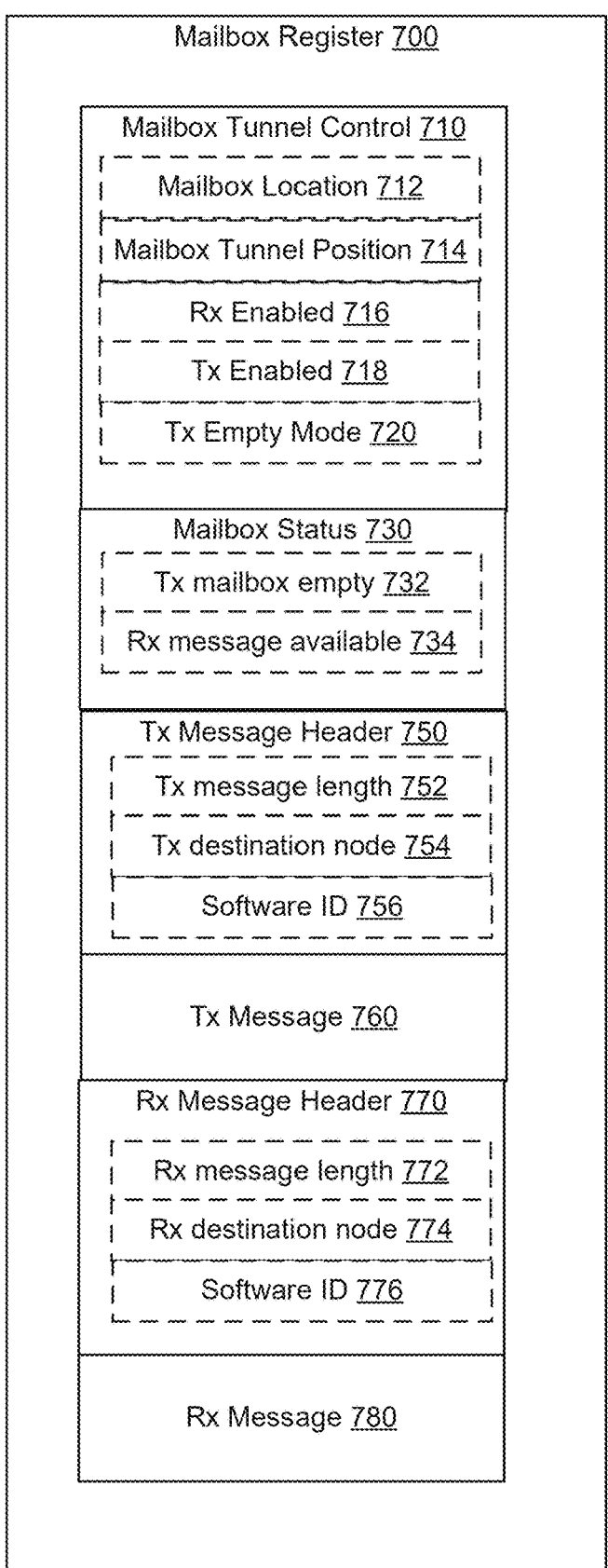
FIG. 7 is a diagram of an example mailbox register, according to an aspect of the disclosure.

FIG. 7 is a diagram of an example mailbox register 700, which may correspond to the Tx mailbox registers 630 and the Rx mailbox registers 670. The mailbox register 700 includes a mailbox tunnel control field 710, a mailbox status 730, a Tx message header 750, a Tx message 760, a Rx message header 770, and a Rx message 780.

The mailbox tunnel control field 710 may be, for example, two or more bytes that define properties of a mailbox tunnel 510 for a node. For instance, the mailbox tunnel control field 710 may include a mailbox location 712, a mailbox tunnel position 714, a Rx enabled flag 716, a Tx enabled flag 718, and a Tx empty mode indicator 720. The mailbox location 712 may specify a location within the downstream flexible payload 414 and/or the upstream flexible payload 454. The mailbox tunnel position 714 may specify a position of the node within the mailbox tunnel 510. For example, the mailbox tunnel position 714 may be head, tail, or body. The Rx enabled flag 716 may indicate whether the node may receive mailbox messages. The Tx enabled flag 718 may indicate whether the node may transmit mailbox messages. The Tx empty mode indicator 720 may indicate a mode in which the node only transmits a new message when the Tx message FIFO buffer 632 is empty.

The mailbox status 730 may indicate one or more states of the node with respect to the mailbox tunnel 510. The mailbox status 730 may include a Tx mailbox empty flag 732 and a Rx message available flag 734. The mailbox status 730 may be indicated (e.g., to the Tx host 620 or Rx host 660) on one or more pins of the node. For example, the positive edge of the Tx mailbox empty flag 732 can generate an interrupt to notify that there is space for a new message. As another example, the positive edge of the Rx message available flag 734 can generate an interrupt to notify that there is a new message in the Rx mailbox registers 670. In some implementations, an error interrupt may be set when a Tx message cannot be sent to the destination node (e.g., due to improper configuration or exceeding a number of frames). Similarly, an error interrupt may be set when there is a reception error such as the Rx message FIFO buffer 672 being full.

The Tx message header 750 includes information that may be included in a header for each packet of a message to transmit. For example, the Tx message header 750 may include a Tx message length 752, a Tx destination node 754, and a software ID 756. The Tx message length 752 may indicate a number of words of payload. The Tx destination node 754 specifies broadcast or an address of a destination node. The software ID 756 may indicate a software message ID (e.g., for interpreting the payload) and can be programmed to any value. The Tx message 760 includes the words of the message.

The Rx message header 770 includes information that may be included in a header for each packet of a message that is received. For example, the Rx message header 770 may include a Rx message length 772, a Tx source node 774, and a software ID 776. The Rx message header 770 may correspond to the Tx message header 750 and may be populated based on a received message. The Rx message 780 includes the words of the received message.

Figure 8:
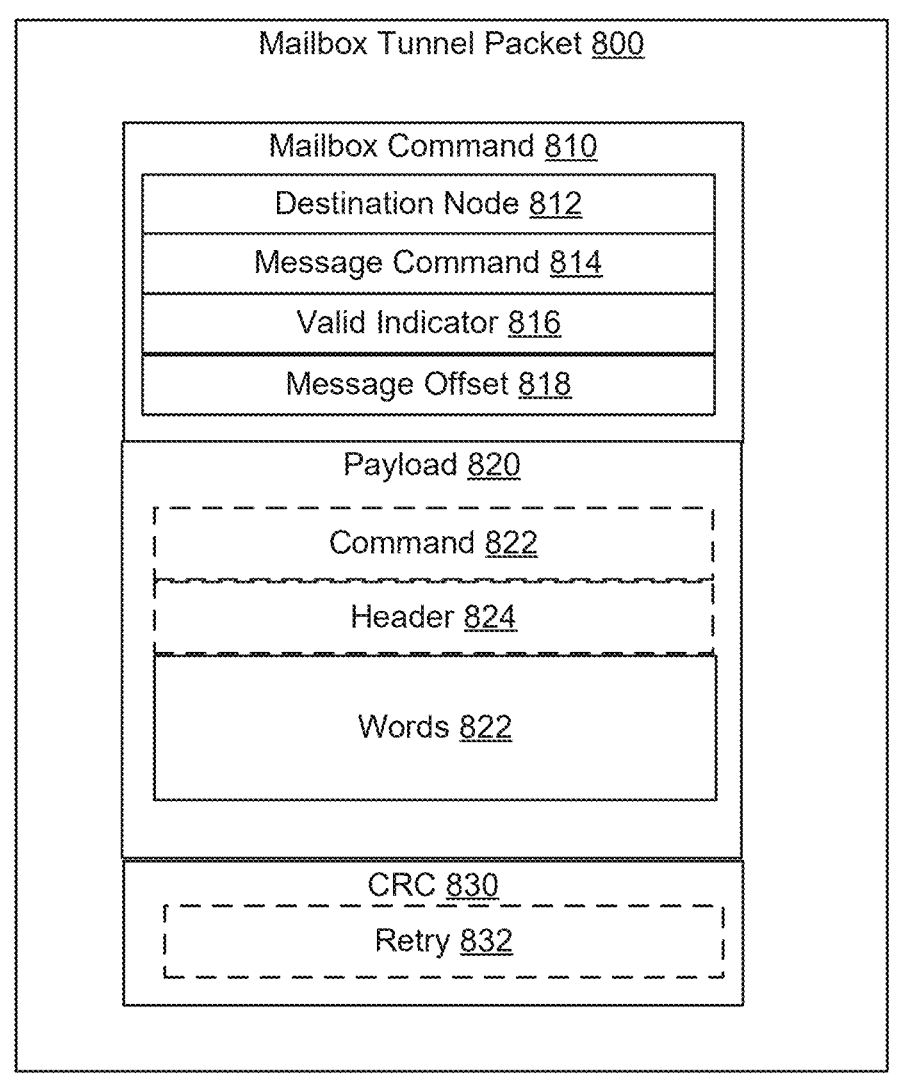
FIG. 8 is a diagram of an example mailbox packet, according to an aspect of the disclosure.

FIG. 8 is a diagram of an example mailbox tunnel packet 800. A mailbox tunnel packet 800 may be transmitted on designated bytes for the tunnel 510 on a downstream superframe 410 in the downstream flexible payload 414 and/or on an upstream superframe 450 in the upstream flexible payload 454. The designated bytes for the tunnel 510 may be a fixed size (e.g., 10 bytes). The mailbox tunnel packet 800 includes a mailbox command 810, a payload 820, and a CRC 830.

In an implementation, the mailbox command 810 is two bytes and includes a destination node 812, a command identifier 814, a message valid indicator 816, and a message offset 818. The destination node 812 corresponds to the Tx destination node 754. The command identifier 814 indicates a message type such as one of an idle message, a write/read message, an acknowledgment, or an error. The message valid indicator 816 indicates whether one or more words of the payload are valid. The message offset 818 indicates an offset of the first valid payload word within the message. For example, a value of 0 indicates a new message.

The message payload 820 includes one or more words of the message, which may or may not be valid, as indicated by the message valid indicator 816. In some implementations, the content of the message payload 820 may depend on the command identifier 814. For instance, in the case of an acknowledgment or an error message, the message payload 820 may include a command field 822 with the mailbox command 810 of a received message. As another example, for a first packet of a message where the message offset 818 equals 0, the payload 820 may include a header field 824 that includes a message header of a received message (i.e., the contents of Rx message header 770).

The CRC 830 includes a cyclic redundancy check value for the mailbox tunnel packet 800. The CRC 830 may include a retry bit 832 that indicates a repeated transmission because no response was seen by the transmitting node 610.

FIG. 9 is a flowchart of an example method 900 performed by a node (e.g., main node 110, sub node 120, or end-sub node 130) in a daisy-chain 102. The method 900 may be performed to communicate a mailbox message in a daisy-chain over full duplex links to one or more connected nodes. The method 900 may be performed in communication with another node in the daisy-chain 102 (e.g., sub node 120 or end-sub node 130).

In block 910, the method 900 may optionally include outputting a mailbox status on one or more pins. For example, the transmitting node 610 may output the mailbox status 730 on one or more pins to the Tx host 620. The mailbox status 730 may include the Tx mailbox empty flag 732.

In block 920, the method 900 may optionally include receiving the new message from a host of the node when the mailbox status indicates that the message buffer has room for a message. For example, the transmitting node 610 may receive the new message from the Tx host 620 when the mailbox status 730 and/or the Tx mailbox empty flag 732 indicates that the message buffer (e.g., Tx message FIFO buffer 632) has room for a message. In some implementations, the Tx empty mode indication 720 affects when the message buffer has room for a message. If Tx empty mode is active, the Tx mailbox empty flag 732 may only indicate that the message buffer has room for a message when the message buffer is empty. If Tx empty mode is not active, the Tx mailbox empty flag 732 may indicate that the message buffer has room for a message when the message buffer has room for a message with a maximum size.

In block 930, the method 900 includes writing a message header and a number of payload words of the new message into a mailbox register as a current message, the current message having a flexible message size or a flexible destination defined by the message header. For example, the transmitting node 610 may write the Tx message header 750 and the Tx message 760 into the mailbox register 700. The Tx message header 750 and the Tx message 760 may correspond to the Tx mailbox registers 630. The flexible message size may be defined by the Tx message length 752 in the Tx message header 750. The flexible destination may be defined by the Tx destination node 754 in the Tx message header 750.

In block 940, the method 900 includes loading the current message to a message buffer configured to store one or more messages including the current message for transmission. For example, the transmitting node 610 may load the current message to the Tx message FIFO buffer 632.

In block 950, the method 900 includes sending the current message from the message buffer as one or more mailbox packets to one or more of the connected nodes that participate in a mailbox tunnel over the daisy-chain. For example, the transmitting node 610 and/or the Tx tunnel controller 634 may send the current message from the Tx message FIFO buffer 632 to one or more of the connected nodes (e.g., receiving node 650) that participate in the mailbox tunnel 510 over the daisy-chain 102.

In some implementations, at sub-block 952, the block 950 may optionally include determining that a mailbox slot of a flexible payload is idle for at least one superframe of the daisy-chain. For example, the transmitting node 610 and/or the Tx tunnel controller 634 may determine that the mailbox slot of the flexible payload 414, 454 is idle based on an idle packet being received on the mailbox slot in each of the downstream direction and the upstream direction.

In some implementations, at sub-block 954, the block 950 may optionally include writing a mailbox packet to the mailbox slot in one or more superframes of the daisy-chain until receipt of the mailbox packet is acknowledged. For example, the transmitting node 610 and/or the Tx tunnel controller 634 may write the mailbox packet to the US TX buff or the DS TX buff in the mailbox slot. The transceiver 106 may then transmit the mailbox packet in one or more superframes 410, 450 of the daisy-chain 102 until receipt of the mailbox packet is acknowledged.

In some implementations, at sub-block 956, the block 950 may optionally include overwriting another mailbox packet in the mailbox slot in a subsequent superframe with the mailbox packet after determining that the mailbox slot is idle. For example, the transceiver 106 may overwrite the mailbox packet 520a with the mailbox packet 520b in the mailbox slot after determining that the mailbox slot is idle. That is, the transmitting node 610 and/or transceiver 106 does not check whether the mailbox slot contains a mailbox packet when writing its own mailbox packet.

In some implementations, at sub-block 958, the block 950 may optionally include transmitting the current message as a point-to-point message to a destination address in one of an upstream direction or a downstream direction. Alternatively, in some implementations, at sub-block 960, the block 950 may optionally include transmitting the current message as a broadcast message in both of an upstream direction and a downstream direction concurrently.

In block 970, the method 900 may optionally include transmitting a valid idle packet in a downstream direction when the node is a most upstream node of the connected nodes that participate in a mailbox tunnel and the node has no message packet to transmit. For example, the transmitting node 610 and/or the Tx tunnel controller 634 may transmit the idle packet when the node is a head node (e.g., as indicated by mailbox tunnel position 714).

In block 980, the method 900 may optionally include transmitting a valid idle packet in an upstream direction when the node is a most downstream node of the connected nodes that participate in a mailbox tunnel and the node has no message packet to transmit. For example, the transmitting node 610 and/or the Tx tunnel controller 634 may transmit the idle packet when the node is a tail node (e.g., as indicated by mailbox tunnel position 714).

FIG. 10 is a flowchart of an example method 1000 performed by a node (e.g., main node 110, sub node 120, or end-sub node 130) in a daisy-chain 102. The method 1000 may be performed to receive a mailbox message in the daisy-chain over full duplex links with one or more connected nodes. The method 1000 may be performed in communication with another node in the daisy-chain 102 (e.g., sub node 120 or end-sub node 130). The method 1000 may be performed in conjunction with the method 900. For example, the method 1000 may be performed before, after, or concurrently with the method 900 with respect to different messages.

At block 1010, the method 1000 includes reading a message packet addressed to the node from a mailbox slot of a flexible payload on one of an upstream superframe or a downstream superframe. For example, the receiving node 650 and/or the Rx tunnel controller 674 may read the message packet addressed to the receiving node 650 from the mailbox slot of the flexible payload 414 or 454 of an upstream superframe 450 or a downstream superframe 410. For instance, the Rx tunnel controller 674 may read the message packet from the DS RX buff or the US RX buff.

At block 1020, the method 1000 includes performing a cyclic redundancy check on the message packet. For example, the receiving node 650 and/or the Rx tunnel controller 674 may perform the cyclic redundancy check by comparing the CRC 830 to a CRC calculated based on the received mailbox packet.

At block 1030, the method 1000 includes transmitting an acknowledgement packet or error packet based on the cyclic redundancy check for the message packet on the other of the upstream superframe or the downstream superframe if the message packet is a point-to-point message addressed to the node or the message packet is a broadcast message and the node is a head node or a tail node. For instance, if the cyclic redundancy check is successful, the Rx tunnel controller 674 may transmit the acknowledgment packet 530 if the node is the destination node of a point-to-point message or, in the case of a broadcast message, if the node is a head node or tail node. In contrast, if the cyclic redundancy check fails, the Rx tunnel controller 674 may transmit an error packet instead of the acknowledgment packet 530.

At block 1040, the method 1000 includes writing header information from a payload of the message packet to a message buffer if the message packet is a first packet of a message. For example, the Rx tunnel controller 674 may write header information in header field 824 from a payload 820 of the mailbox tunnel packet 800 to a message buffer (e.g., Rx message FIFO buffer 672) if the received message packet is a first packet of a message (e.g., the message offset 818 is 0).

At block 1050, the method 1000 includes writing payload data from the received message packet to the message buffer based on an offset of the received message packet. For example, the Rx tunnel controller 674 may write data from payload 820 from the mailbox tunnel packet 800 to the message buffer (e.g., Rx message 780 of Rx message FIFO buffer 672) based on an offset 818 of the message packet. Accordingly, the Rx tunnel controller 674 may reassemble the received message in the message buffer.

At block 1060, the method 1000 includes moving a message header and message content from the message buffer to a message register as a current received message. For example, the receiving node 650 may move the message header and message content from the message buffer to the message register 670 as a current received message.

At block 1070, the method 1000 includes outputting a mailbox status on one or more pins. For example, the receiving node 650 may output the mailbox status 730 including the Rx message available flag 734 on the one or more pins in response to moving the message header and message content to the message register as the new received message. The Rx host 660 may then read the current received message from the message register 670.

Example aspects are described in the following numbered clauses:

Clause 1. A node connected in a daisy-chain over full duplex links to one or more connected nodes, the node comprising: a mailbox register configured to store a message header and one or more words of a current message for one or both of a transmit direction or a receive direction; a message buffer configured to store one or more messages including the current message for transmission or reception; and a tunnel controller configured to communicate the current message from or to the message buffer as one or more mailbox packets with one or more of the connected nodes that participate in a mailbox tunnel over the daisy-chain, the current message having a flexible message size or a flexible destination defined by the message header.

Clause 2. The node of clause 1, wherein a mailbox packet includes: an indication of a broadcast message or a destination address; a message offset that indicates a position within the message; a payload; and a cyclic redundancy check value.

Clause 3. The node of clause 1, wherein the mailbox register defines: a control field for the mailbox tunnel; a mailbox status for one or both of a transmission message or a receive message; a transmission message header, a transmission message, a receive message header, and a receive message.

Clause 4. The node of clause 3, wherein the node is configured to output the mailbox status on one or more pins.

Clause 5. The node of clause 3, wherein the control field defines one or more of: a mailbox tunnel location within a flexible payload of the daisy-chain, a mailbox tunnel position of the node, whether reception is enabled, whether transmission is enabled, or whether the node operates in a transmission mailbox empty mode.

Clause 6. The node of clause 1, wherein to communicate a mailbox message as one or more mailbox packets over the daisy-chain the tunnel controller is configured to: determine that a mailbox slot of a flexible payload is idle for at least one superframe of the daisy-chain; and write a mailbox packet to the mailbox slot in one or more superframes of the daisy-chain until receipt of the mailbox packet is acknowledged.

Clause 7. The node of clause 6, wherein the tunnel controller is configured to overwrite another mailbox packet in the mailbox slot in a subsequent superframe with the mailbox packet after determining that the mailbox slot is idle.

Clause 8. The node of clause 1, wherein the node is configured to: receive a new message from a host of the node; write a message header and number of payload words of the new message into the mailbox register as the current message; and load the current message into the message buffer.

Clause 9. The node of clause 1, wherein the tunnel controller is configured to: transmit a valid idle packet in a downstream direction when the node is a most upstream node of the connected nodes that participate in a mailbox tunnel and the node has no message packet to transmit; or transmit a valid idle packet in an upstream direction when the node is a most downstream node of the connected nodes that participate in a mailbox tunnel and the node has no message packet to transmit.

Clause 10. The node of clause 1, wherein the tunnel controller is configured to transmit the current message as a point-to-point message to a destination address in one of an upstream direction or a downstream direction.

Clause 11. The node of clause 1, wherein the tunnel controller is configured to transmit the current message as a broadcast message in both of an upstream direction and a downstream direction concurrently.

Clause 12. The node of clause 1, wherein the tunnel controller is configured to: read a message packet addressed to the node from a mailbox slot of a flexible payload on one of an upstream superframe or a downstream superframe; perform a cyclic redundancy check on the message packet; and transmit an acknowledgement packet or error packet based on the cyclic redundancy check for the message packet on the other of the upstream superframe or the downstream superframe if the message packet is a point-to-point message addressed to the node or the message packet is a broadcast message and the node is a head node or a tail node.

Clause 13. A method for a node to communicate a mailbox message in a daisy-chain over full duplex links to one or more connected nodes, the method comprising: writing a message header and a number of payload words of a new message into a mailbox register as a current message, the current message having a flexible message size or a flexible destination defined by the message header; loading the current message to a message buffer configured to store one or more messages including the current message for transmission; and sending the current message from the message buffer as one or more mailbox packets to one or more of the connected nodes that participate in a mailbox tunnel over the daisy-chain.

Clause 14. The method of clause 13, wherein sending the current message as one or more mailbox packets over the daisy-chain comprises: determining that a mailbox slot of a flexible payload is idle for at least one superframe of the daisy-chain; and writing a mailbox packet to the mailbox slot in one or more superframes of the daisy-chain until receipt of the mailbox packet is acknowledged.

Clause 15. The method of clause 14, wherein sending the current message as one or more mailbox packets over the daisy-chain comprises overwriting another mailbox packet in the mailbox slot in a subsequent superframe with the mailbox packet after determining that the mailbox slot is idle.

Clause 16. The method of clause 13, further comprising: outputting a mailbox status on one or more pins; and receiving the new message from a host of the node when the mailbox status indicates that the message buffer has room for a message.

Clause 17. The method of clause 13, further comprising: transmitting a valid idle packet in a downstream direction when the node is a most upstream node of the connected nodes that participate in a mailbox tunnel and the node has no message packet to transmit; or transmitting a valid idle packet in an upstream direction when the node is a most downstream node of the connected nodes that participate in a mailbox tunnel and the node has no message packet to transmit.

Clause 18. The method of clause 13, wherein sending the mailbox message as one or more mailbox packets over the daisy-chain comprises transmitting the current message as a point-to-point message to a destination address in one of an upstream direction or a downstream direction.

Clause 19. The method of clause 13, wherein sending the mailbox message as one or more mailbox packets over the daisy-chain comprises transmitting the current message as a broadcast message in both of an upstream direction and a downstream direction concurrently.

Clause 20. The method of clause 13, further comprising: reading a message packet addressed to the node from a mailbox slot of a flexible payload on one of an upstream superframe or a downstream superframe; performing a cyclic redundancy check on the message packet; and transmitting an acknowledgement packet or error packet based on the cyclic redundancy check for the message packet on the other of the upstream superframe or the downstream superframe if the message packet is a point-to-point message addressed to the node or the message packet is a broadcast message and the node is a head node or a tail node.

Clause 21. The method of clause 20, further comprising: writing header information from a payload of the message packet to a message buffer if the message packet is a first packet of a message; writing payload data from the message packet to the message buffer based on an offset of the message packet; moving a message header and message content from the message buffer to a message register as a current received message; and outputting a mailbox status on one or more pins.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, scripts, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The invention claimed is:

1. A node connected in a daisy-chain over full duplex links to one or more connected nodes, the node comprising:
   a mailbox register configured to store a message header and one or more words of a current message for one or both of a transmit direction or a receive direction;
   a message buffer configured to store one or more messages including the current message for transmission or reception; and
   a tunnel controller configured to communicate the current message from or to the message buffer as one or more mailbox packets with one or more of the connected nodes that participate in a mailbox tunnel over the daisy-chain, the current message having a flexible message size or a flexible destination defined by the message header.

2. The node of claim 1, wherein a mailbox packet includes: an indication of a broadcast message or a destination address; a message offset that indicates a position within the message; a payload; and a cyclic redundancy check value.

3. The node of claim 1, wherein the mailbox register defines: a control field for the mailbox tunnel; a mailbox status for one or both of a transmission message or a receive message; a transmission message header, a transmission message, a receive message header, and a receive message.

4. The node of claim 3, wherein the node is configured to output the mailbox status on one or more pins.

5. The node of claim 3, wherein the control field defines one or more of: a mailbox tunnel location within a flexible payload of the daisy-chain, a mailbox tunnel position of the node, whether reception is enabled, whether transmission is enabled, or whether the node operates in a transmission mailbox empty mode.

6. The node of claim 1, wherein to communicate a mailbox message as one or more mailbox packets over the daisy-chain the tunnel controller is configured to:
   determine that a mailbox slot of a flexible payload is idle for at least one superframe of the daisy-chain; and
   write a mailbox packet to the mailbox slot in one or more superframes of the daisy-chain until receipt of the mailbox packet is acknowledged.

7. The node of claim 6, wherein the tunnel controller is configured to overwrite another mailbox packet in the mailbox slot in a subsequent superframe with the mailbox packet after determining that the mailbox slot is idle.

8. The node of claim 1, wherein the node is configured to:
   receive a new message from a host of the node;
   write a message header and number of payload words of the new message into the mailbox register as the current message; and
   load the current message into the message buffer.

9. The node of claim 1, wherein the tunnel controller is configured to:
   transmit a valid idle packet in a downstream direction when the node is a most upstream node of the connected nodes that participate in a mailbox tunnel and the node has no message packet to transmit; or
   transmit a valid idle packet in an upstream direction when the node is a most downstream node of the connected nodes that participate in a mailbox tunnel and the node has no message packet to transmit.

18

10. The node of claim 1, wherein the tunnel controller is configured to transmit the current message as a point-to-point message to a destination address in one of an upstream direction or a downstream direction.

11. The node of claim 1, wherein the tunnel controller is configured to transmit the current message as a broadcast message in both of an upstream direction and a downstream direction concurrently.

12. The node of claim 1, wherein the tunnel controller is configured to:
   read a message packet addressed to the node from a mailbox slot of a flexible payload on one of an upstream superframe or a downstream superframe;
   perform a cyclic redundancy check on the message packet; and
   transmit an acknowledgement packet or error packet based on the cyclic redundancy check for the message packet on the other of the upstream superframe or the downstream superframe if the message packet is a point-to-point message addressed to the node or the message packet is a broadcast message and the node is a head node or a tail node.

13. A method for a node to communicate a mailbox message in a daisy-chain over full duplex links to one or more connected nodes, the method comprising:
   writing a message header and a number of payload words of a new message into a mailbox register as a current message, the current message having a flexible message size or a flexible destination defined by the message header;
   loading the current message to a message buffer configured to store one or more messages including the current message for transmission; and
   sending the current message from the message buffer as one or more mailbox packets to one or more of the connected nodes that participate in a mailbox tunnel over the daisy-chain.

14. The method of claim 13, wherein sending the current message as one or more mailbox packets over the daisy-chain comprises:
   determining that a mailbox slot of a flexible payload is idle for at least one superframe of the daisy-chain; and
   writing a mailbox packet to the mailbox slot in one or more superframes of the daisy-chain until receipt of the mailbox packet is acknowledged.

15. The method of claim 14, wherein sending the current message as one or more mailbox packets over the daisy-chain comprises overwriting another mailbox packet in the mailbox slot in a subsequent superframe with the mailbox packet after determining that the mailbox slot is idle.

16. The method of claim 13, further comprising:
   outputting a mailbox status on one or more pins; and
   receiving the new message from a host of the node when the mailbox status indicates that the message buffer has room for a message.

17. The method of claim 13, further comprising:
   transmitting a valid idle packet in a downstream direction when the node is a most upstream node of the connected nodes that participate in a mailbox tunnel and the node has no message packet to transmit; or
   transmitting a valid idle packet in an upstream direction when the node is a most downstream node of the connected nodes that participate in a mailbox tunnel and the node has no message packet to transmit.

18. The method of claim 13, wherein sending the mailbox message as one or more mailbox packets over the daisy-chain comprises transmitting the current message as a point-to-point message to a destination address in one of an upstream direction or a downstream direction.

19. The method of claim 13, wherein sending the mailbox message as one or more mailbox packets over the daisy-chain comprises transmitting the current message as a broadcast message in both of an upstream direction and a downstream direction concurrently.

20. The method of claim 13, further comprising:
reading a message packet addressed to the node from a mailbox slot of a flexible payload on one of an upstream superframe or a downstream superframe;
performing a cyclic redundancy check on the message packet; and
transmitting an acknowledgement packet or error packet based on the cyclic redundancy check for the message packet on the other of the upstream superframe or the downstream superframe if the message packet is a point-to-point message addressed to the node or the message packet is a broadcast message and the node is a head node or a tail node.

21. The method of claim 20, further comprising:
writing header information from a payload of the message packet to a message buffer if the message packet is a first packet of a message;
writing payload data from the message packet to the message buffer based on an offset of the message packet;

20 moving a message header and message content from the message buffer to a message register as a current received message; and
outputting a mailbox status on one or more pins.

22. A communication system, comprising:
a plurality of nodes connected in a daisy-chain over full duplex links, each node associated with a host, wherein a subset of the nodes are configured to participate in a mailbox tunnel, wherein at least one node of the subset of nodes is configured to:
write a message header and a number of payload words of a new message from a respective host into a mailbox register as a current message, the current message having a flexible message size or a flexible destination defined by the message header; and
send the current message as one or more mailbox packets to one or more of the subset of nodes in a mailbox slot of one or more superframes of the daisy-chain.

23. The communication system of claim 22, wherein when multiple nodes send a mailbox packet on the mailbox slot in a same superframe, the at least one node is configured to overwrite a received mailbox packet in the mailbox slot and transmit the one or more mailbox packets for the current message until the current message is complete, then forward a mailbox packet received in a subsequent superframe.

* * * * *